United States Patent
Oshins et al.

(10) Patent No.: US 7,689,800 B2
(45) Date of Patent: Mar. 30, 2010

(54) PARTITION BUS

(75) Inventors: Jacob Oshins, Seattle, WA (US); Peter L. Johnston, Bellevue, WA (US); Eric P. Traut, Bellevue, WA (US); Nathan Lewis, Sammamish, WA (US); Jeffrey Kinsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 393 days.

(21) Appl. No.: 11/128,647

(22) Filed: May 12, 2005

(65) Prior Publication Data

US 2006/0259731 A1    Nov. 16, 2006

(51) Int. Cl.
    *G06F 12/00*   (2006.01)
(52) U.S. Cl. ...................................................... 711/173
(58) Field of Classification Search .................. 711/173
    See application file for complete search history.

(56) References Cited

U.S. PATENT DOCUMENTS

| | | | | |
|---|---|---|---|---|
| 5,548,728 | A * | 8/1996 | Danknick | 709/213 |
| 6,904,400 | B1 * | 6/2005 | Peri et al. | 703/28 |
| 7,181,744 | B2 * | 2/2007 | Shultz et al. | 718/104 |
| 7,318,140 | B2 * | 1/2008 | Flemming et al. | 711/173 |
| 7,376,949 | B2 * | 5/2008 | Lowell et al. | 718/1 |
| 2002/0129274 | A1 * | 9/2002 | Baskey et al. | 713/201 |
| 2003/0037178 | A1 * | 2/2003 | Vessey et al. | 709/319 |
| 2003/0093258 | A1 * | 5/2003 | Fishstein et al. | 703/21 |
| 2004/0083481 | A1 | 4/2004 | Shultz et al. | |

FOREIGN PATENT DOCUMENTS

| | | |
|---|---|---|
| EP | 0 991 081 | 11/2005 |
| WO | WO 00/36509 | 6/2000 |

OTHER PUBLICATIONS

Barham, P. et al., "Xen and the Art of Virtualization," *Proceedings of the ACM Symposium on Operating Systems Principles*, Oct. 2003, 164-177.
Bugnion, E. et al., "Disco: Running Commodity Operating Systems on Scalable Multiprocessors," *ACM Transactions on Computer Systems*, New York, NY, Nov. 1997, 15(4), 412-447.

* cited by examiner

*Primary Examiner*—Matt Kim
*Assistant Examiner*—Hamdy S Ahmed
(74) *Attorney, Agent, or Firm*—Woodcock Washburn LLP

(57) ABSTRACT

A method and system are provided for integrating partitions in a virtual machine environment. Specifically, a partition bus is provided, where the partition bus operatively connects partitions in such a way that it functions as a data transport mechanism allowing for data transfer and device sharing between partitions. The partition bus relies on virtualizing software in order to establish itself and to establish channels of communication between partitions and to inject interrupts to partitions where it is appropriate to do so. Furthermore, the partition bus employs such mechanisms ring buffers, transfer pages, and memory map changes to transfer information (requests and data). Furthermore, it uses policy agents to decide when information should be transferred or when devices should be shared among partitions. Lastly, it employs various mechanisms to ensure smooth integration between partitions, which includes remote services that have proxy devices and device versioning functionalities.

19 Claims, 16 Drawing Sheets

PARTITION BUS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2005, Microsoft Corp.

FIELD OF THE INVENTION

The present invention generally relates to the field of virtual machines (or "partitions") and to operating systems that execute within such partitions. More specifically, the present invention relates to systems and methods for moving data and sharing devices among partitions.

BACKGROUND OF THE INVENTION

In a typical virtual machine environment, multiple virtual machines or "partitions" run on top of virtualizing software. This software, in turn, runs on top of hardware. The virtualizing software exposes the hardware in such a fashion that allows for a plurality of partitions, each with its own operating system (OS), to run on the hardware. The hardware is thus virtualized for the partitions by the virtualizing software.

Individual partitions are able to run disparate OSes, such as Windows, Linux, Solaris, and so on. These OSes can be isolated from each other such that if one OS in a partition crashes it will not affect other OSes in other partitions.

One cost associated with running multiple partitions on one set of hardware is that the virtualizing software consumes significant processor cycles as it virtualizes devices for each partition. Likewise, the virtualizing software consumes significant cycles as information (requests and/or data) or devices are shared among such partitions, the reason being that the virtualizing software must process this information and devices as it is being shared across partitions.

Specifically, in any given virtual machine environment, a class of problems arises because some, and probably all, of the input/output devices present in the partitions have not been designed to be shared with multiple OSes found in other partitions. Most devices' programming models assume that there is one and only one OS that "owns" the device, which makes it very hard or impossible to use that device simultaneously by several operating systems found in various partitions. Problems could arise if, for example, a disk controller were getting commands simultaneously from two operating systems. Each would think that it controlled the file system structures, and each would write whatever data it chose and soon the disk would be corrupted. To keep this from happening, it would be advantageous to devise some method and system to assign ownership of a device to a single operating system and then share that device's services with any other running operating system.

Additionally, a separate class of problems arises when multiple operating systems try to share the same machine, because users need some level of integration between these operating systems. For example, a user may want to move data between the operating systems found in their respective partitions. Thus, it would also be advantageous to provide a method and system of moving data, or more broadly, information between running operating systems.

SUMMARY OF THE INVENTION

Methods and systems are provided in various aspects of the present invention that allow for device sharing and data transfer between various partitions in a virtual machine environment. In one aspect of the invention, a partition bus is provided, where the partition bus is a data transport mechanism that allows for the aforementioned inter-partition device sharing and data transfer.

In particular, the partition bus uses ring buffers to transfer information (requests and/or data) from one partition to another partition. In other aspects of the invention, the partition bus uses ring buffers to send requests from one partition to another partition, and transfer pages to send data from one partition to another partition. In still other aspects of the invention, the partition bus uses ring buffers to send requests between partitions and address space manipulation to transfer data between partitions.

In additional aspects of the invention, the partition bus allows for the existence of local proxy synthetic devices in one partition that correspond to services in another partition. The partition bus also allows for these synthetic devices to correspond to either real devices, such as storage controllers, or abstract services such as drag-and-drop functionalities. In further aspects, the partition bus provides a mechanism for sending data between partitions without incurring the cost of context switching by mapping ring buffers into these partitions that can be written into and read from by these partitions. In still further aspects, the partition bus provides a versioning mechanism where a service located in a partition has a globally unique identification based on the type of service and the instance of the service. In other aspects, the partition bus uses a policy decision agent for vetting channel offers made by one partition to another partition. This policy agent can be located in a third partition. In still further aspects, the partition bus allows for the simultaneous operation of hardware emulated device modules and virtualization service providers. In yet still further aspects, the partition bus is composed of a combination of three components, depending on whether a client component is in user mode or kernel mode. The components include: ring buffer management, channel management, and a bus driver.

Other features of the invention are described below.

BRIEF DESCRIPTION OF THE DRAWINGS

The foregoing summary, as well as the following detailed description of the invention, is better understood when read in conjunction with the appended drawings. In order to illustrate the invention, various aspects of the invention are shown. However, the invention is not limited to the specific systems and methods disclosed. The following figures are included.

DETAILED DESCRIPTION OF ILLUSTRATIVE ASPECTS OF THE INVENTION

Overview

Various aspects of a partition bus are discussed. At first, an exemplary computing environment is provided along with a general discussion of partitions with operating systems in virtual machine environments. Following this discussion, the partition bus's inter-partition data transfer and device sharing capabilities are discussed in detail. A general description of the partition bus is provided, followed by a detailed examination of the partition bus' device sharing capability of services by use of synthetic devices, and followed by a detailed examination of the partition bus' information transferring capability using ring buffers, transfer pages, and address space manipulation. Additionally, further aspects of the partition bus are considered, such as the use of a policy agents that vet partition channel offers.

Exemplary Computing Environment

Figure 1:
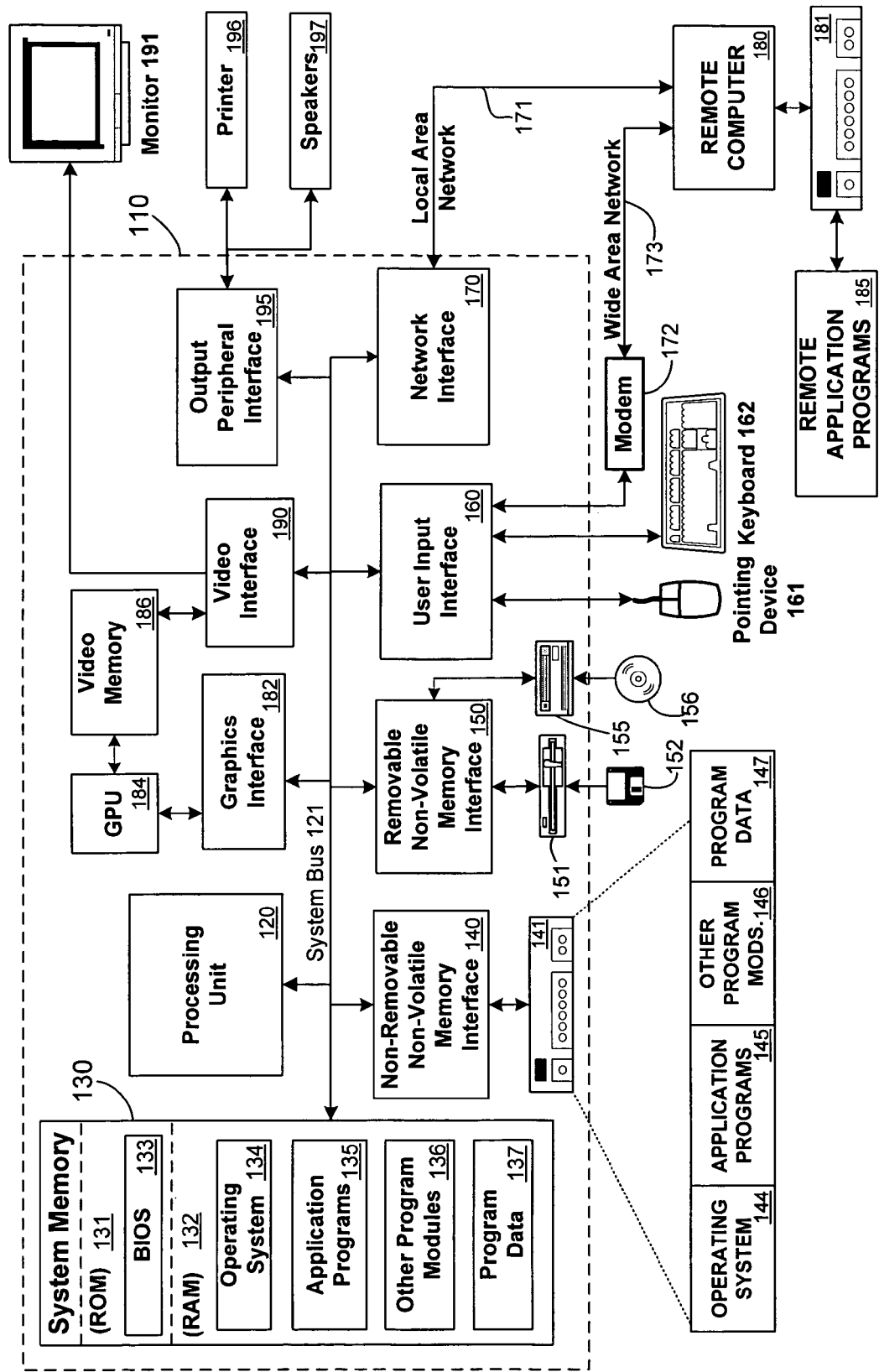
FIG. 1 provides a brief general description of a suitable computing device in connection with which the invention may be implemented.

FIG. 1 and the following discussion are intended to provide a brief general description of a suitable computing device in connection with which the invention may be implemented. For example, any of the client and server computers or devices illustrated in FIG. 1 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Virtual Machines

Figure 2:
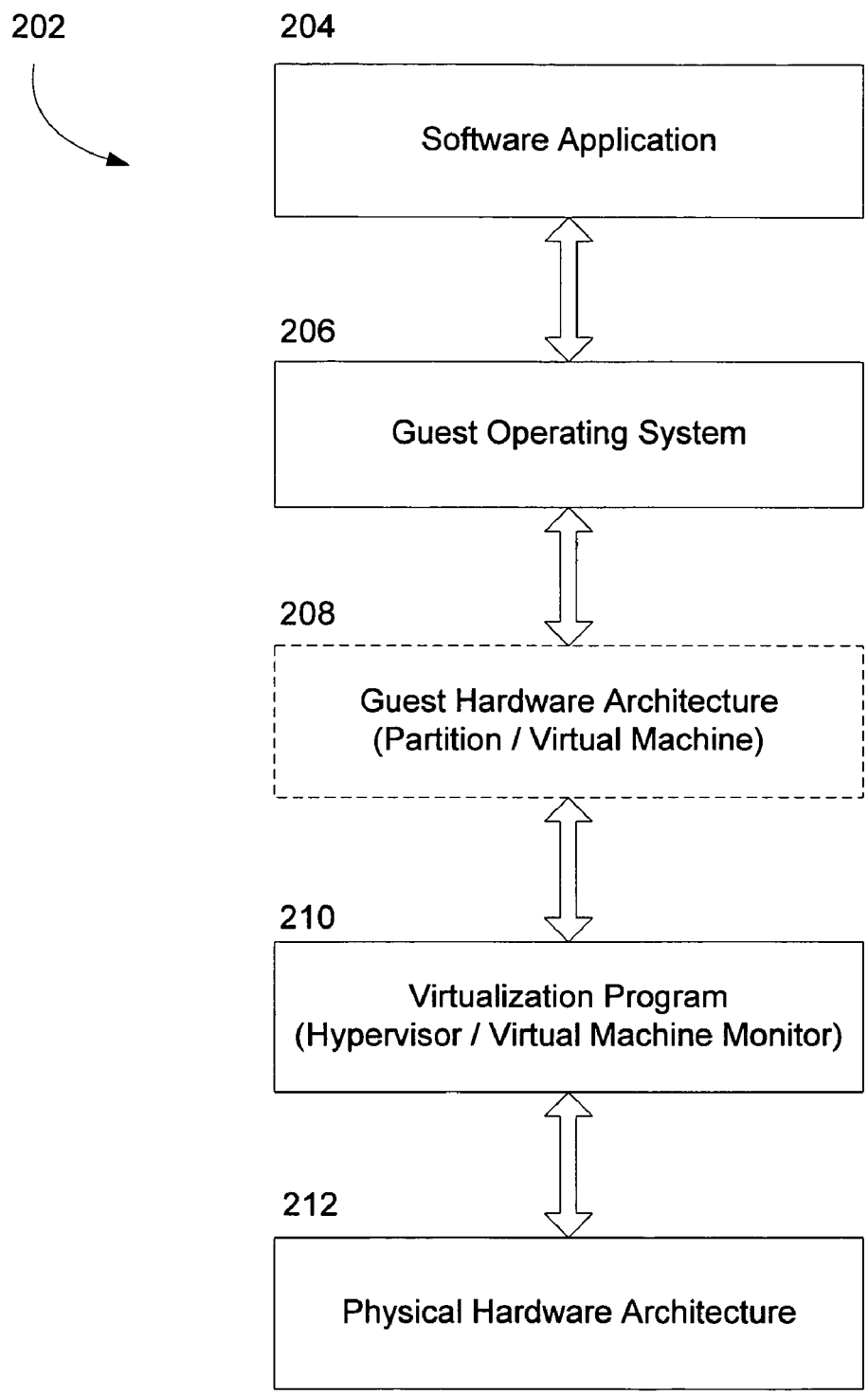
FIG. 2 is a block diagram representing the logical layering of the hardware and software architecture for virtualized operating environment in a computer system.

FIG. 2 is a diagram representing the logical layering of the hardware and software architecture for a virtualized environment in a computer system. In the figure, a virtualization program 210 runs directly or indirectly on the physical hardware architecture 212. The virtualization program 210 may be (a) a virtual machine monitor that runs alongside a host operating system or a host operating system with a hypervisor component wherein the hypervisor component performs the virtualization. The virtualization program 210 virtualizes a guest hardware architecture 208 (shown as dashed lines to illustrate the fact that this component is a partition or a "virtual machine"), that is, hardware that does not actually exist but is instead virtualized by the virtualizing program 210. A guest operating system 206 executes on the guest hardware architecture 208, and a software application 204 runs on the guest operating system 206. In the virtualized operating environment of FIG. 2, the software application 204 can run in a computer system 202 even if the software application 204 is designed to run on an operating system that is generally incompatible with a host operating system and the hardware architecture 212.

Figure 3A:
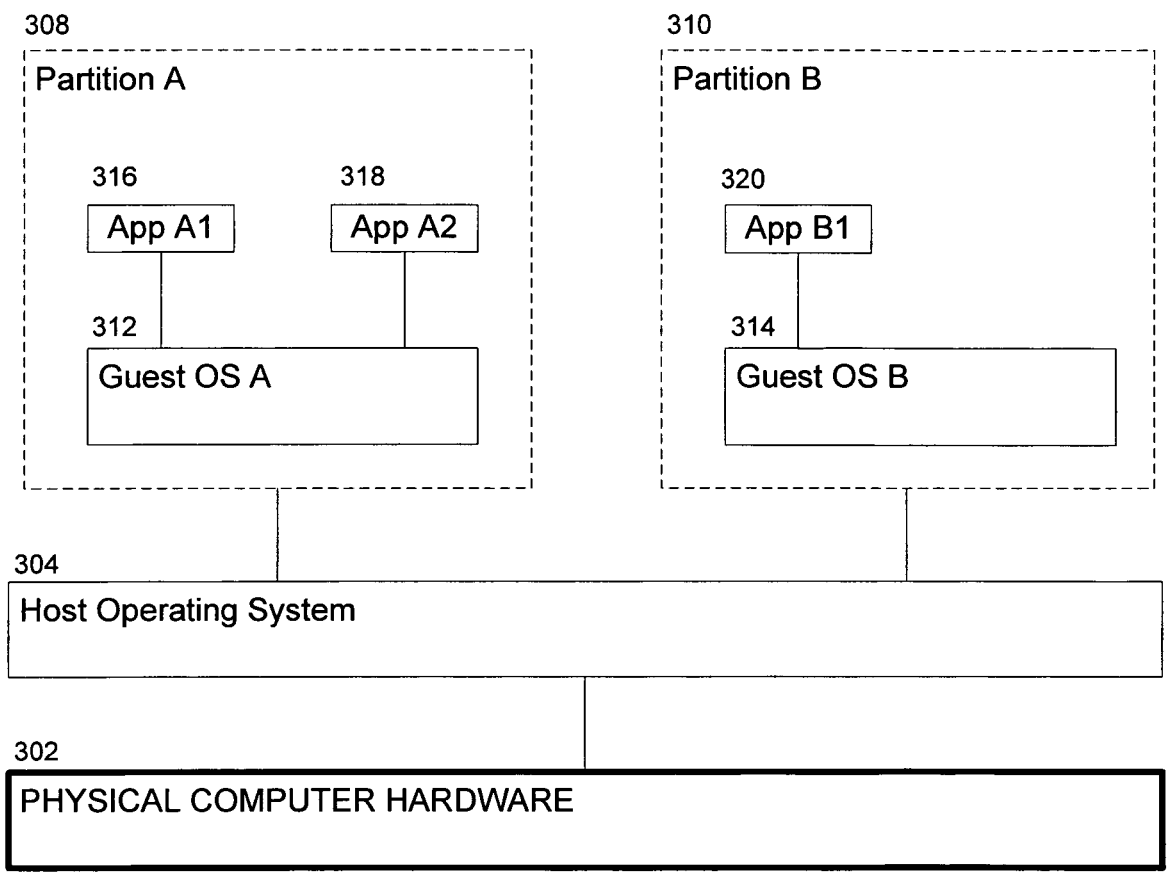
FIG. 3A is a block diagram representing a virtualized computing system wherein the virtualization is performed by the host operating system (either directly or via a hypervisor)

FIG. 3A illustrates a virtualized computing system comprising a host operating system (host OS) software layer 304 running directly above physical computer hardware 302, where the host OS 304 provides access to the resources of the physical computer hardware 302 by exposing interfaces to partitions A 308 and B 310 for the use by operating systems 312 and 314, respectively. This enables the host OS 304 to go unnoticed by operating system layers 312 and 314 running above it. Again, to perform the virtualization, the host OS 304 may be a specially designed operating system with native virtualization capabilities or, alternately, it may be a standard operating system with an incorporated hypervisor component for performing the virtualization (not shown).

Referring again to FIG. 3A, above the host OS 304 are two partitions, partition A 308, which may be, for example, a virtualized Intel 386 processor, and partition B 310, which may be, for example, a virtualized version of one of the Motorola 680X0 family of processors. Within each partition 308 and 310 are guest operating systems (guest OSes) A 312 and B 314, respectively. Running on top of guest OS A 312 are two applications, application A1 316 and application A2 318, and running on top of guest OS B 314 is application B1 320.

In regard to FIG. 3A, it is important to note that partition A 308 and partition B 314 (which are shown in dashed lines) are virtualized computer hardware representations that exist only as software constructs. They are made possible due to the execution of specialized virtualization software(s) that not only presents partition A 308 and partition B 310 to Guest OS A 312 and Guest OS B 314, respectively, but which also performs all of the software steps necessary for Guest OS A 312 and Guest OS B 314 to indirectly interact with the real physical computer hardware 302.

Figure 3B:
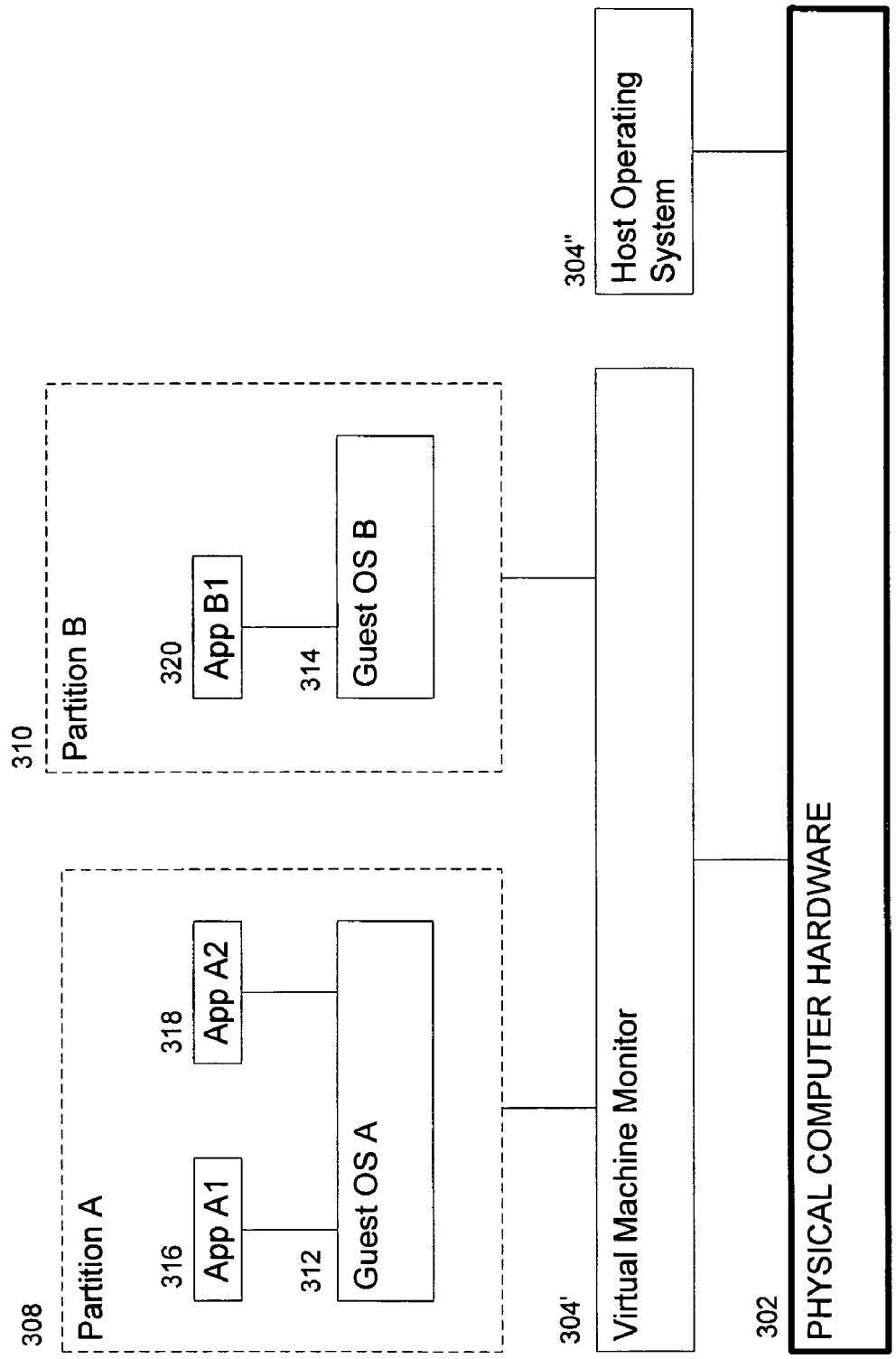
FIG. 3B is a block diagram representing an alternative virtualized computing system wherein the virtualization is performed by a virtual machine monitor running side-by-side with a host operating system.

FIG. 3B illustrates an alternative virtualized computing system wherein the virtualization is performed by a virtual machine monitor (VMM) 304' running alongside the host operating system 304". In certain cases, the VMM 304' may be an application running above the host operating system 304" and interacting with the computer hardware 302 only through the host operating system 304". In other cases, as shown in FIG. 3B, the VMM 304' may instead comprise a partially independent software system that on some levels interacts indirectly with the computer hardware 302 via the host operating system 304" but on other levels the VMM 304' interacts directly with the computer hardware 302 (similar to the way the host operating system interacts directly with the computer hardware). And yet in other cases, the VMM 304' may comprise a fully independent software system that on all levels interacts directly with the computer hardware 302 (similar to the way the host operating system interacts directly with the computer hardware) without utilizing the host operating system 304" (although still interacting with the host operating system 304" in order to coordinate use of the computer hardware 302 and avoid conflicts and the like).

All of these variations for implementing the above mentioned partitions are just exemplary implementations, and nothing herein should be interpreted as limiting the invention to any particular virtualization aspect.

The Partition Bus in General: Device Sharing and Data Transport

In one aspect of the present invention, a software model of a hardware bus is created. This "bus" is a "partition bus." The partition bus allows for formalization of an inter-partition data transfer mechanism. Also, by using a partition bus, it becomes much easier to build services which allow device sharing and inter-OS integration.

The partition bus is an information (requests and/or data) transport mechanism for use between or within partitions in a system with multiple partitions running. However, it is not intended to be the only information transport mechanism available in a virtual machine environment. As such, it does not have to meet every single possible goal of a client partition, in a client partition/service partition relationship. For example, it does not have to be loaded in a NT kernel-mode environment early enough that the hardware abstraction layer (HAL) can use it for initialization.

In one aspect, the partition bus relies on a hypervisor inter-process communication (IPC) in order to set itself up, to establish channels of communication between partitions, and to inject interrupts into partitions.

Figure 4:
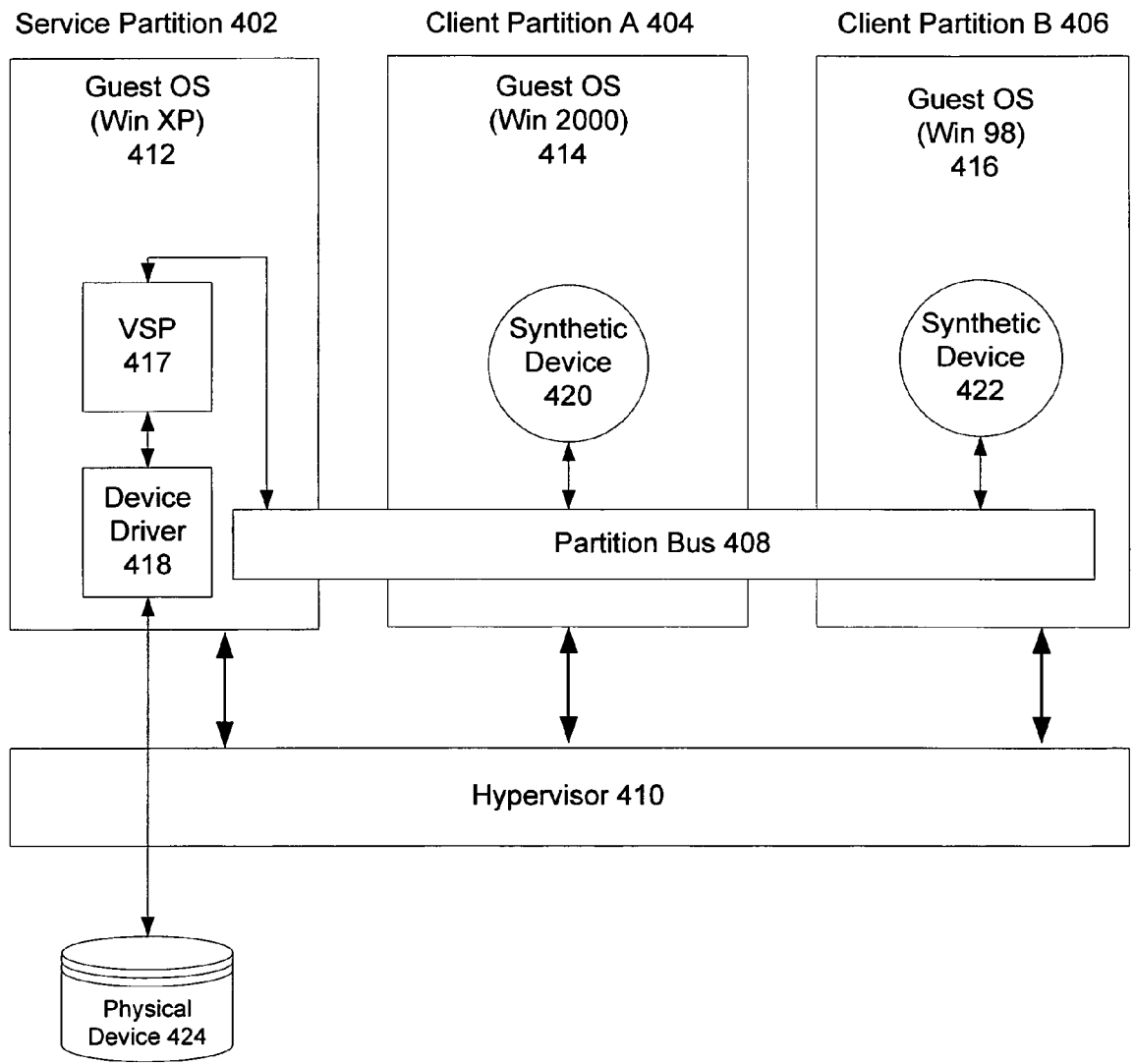
FIG. 4 illustrates a general aspect of a partition bus allowing for transfer of data and sharing of devices between partitions.

FIG. 4 illustrates a general notion of the partition bus, which allows for device sharing and information transport across partitions. Three partitions are depicted, a service partition 402 and two client partitions: client partition A 404 and client partition B 406. These partitions are maintained by a hypervisor 410. Each of these partitions may have some OS, either the same OS as the other partitions or a different one. Thus, the service partition 402, can be running Windows XP; client partition A 404 can be running Windows 2000, and client partition B 406 can be running Windows 98.

Moreover, each of these partitions contains some devices. In particular, the service partition 402 contains a device driver 418 for a physical device 424. The device driver 418 communicates with a virtualization service provider (VSP) 417 that allows synthetic devices to communicate with the physical device 424. Thus, a synthetic device 420 in client partition A 404 and a synthetic device 422 in client partition B 406 can use the services of the physical device 424 via the partition bus 408.

The partition bus 408 provides a means for client partition A 404 and client partition B 406 to have access to the physical device 424 for use by their synthetic devices 420 and 422, respectively. Put another way, the partition bus 408 provides means for assigning ownership of a device, such as physical device 424, to a single OS, such as Windows XP 412, and then a means of sharing that device's services with the other running OSes, such as, Windows 2000 414 and Windows 98 416.

Additionally, the partition bus 408 also allows the OSes to move data between partitions, such that data can be easily moved, say, from the service partition 402 to the second client partition B 406, without incurring the high computing cost of involving the traditional hypervisor 410 mechanisms in the data moving transaction.

Partition Bus: Device Sharing

Figure 5A:
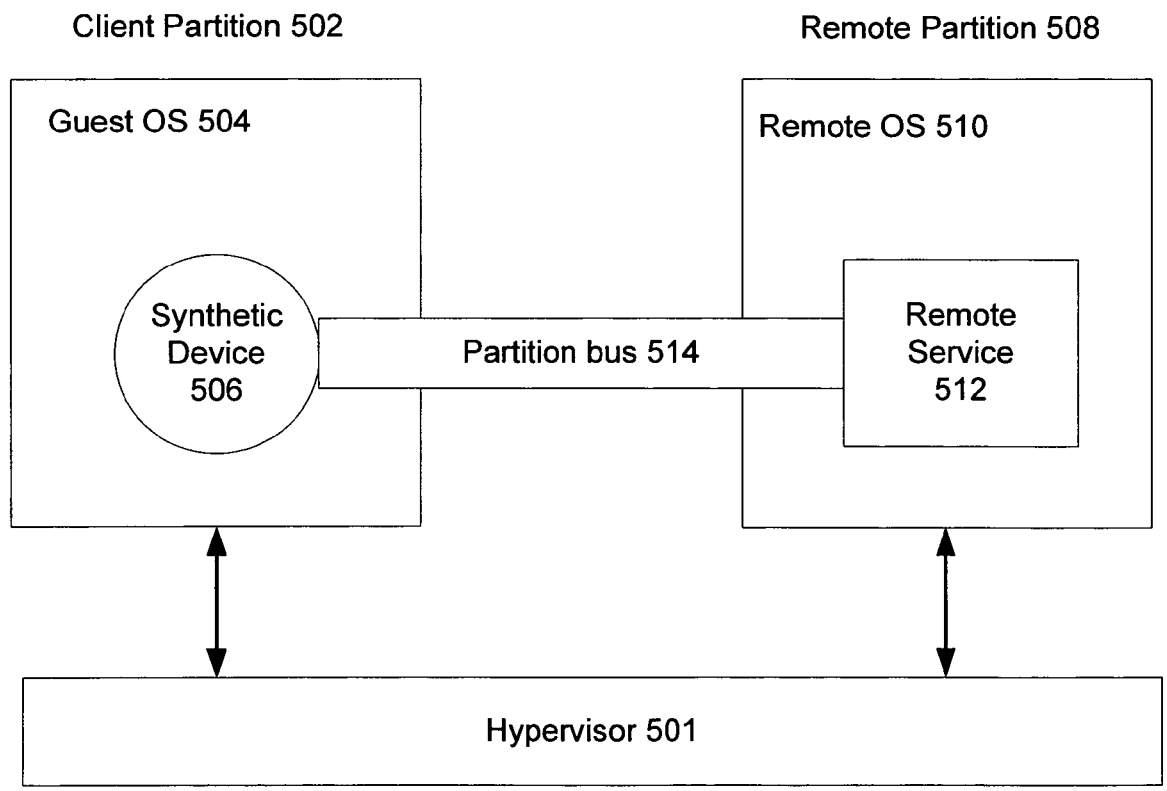
FIG. 5A illustrates remote services which are represented by local proxy synthetic devices.

In another aspect of the invention, FIG. 5A illustrates remote services which are represented by local proxy synthetic devices in a partition. When a remote service 512, stored, for example, in some remote partition 508 with some remote operating system 510, is offered through a partition bus 514, a synthetic device 506 is added to a client partition's operating system 504. There is a one-to-one correspondence between service instances, like the remote service 512, and synthetic devices, like device 506. Each of the synthetic devices can be used to send or receive data as would be true of any typical device on a typical protocol bus.

Figure 5B:
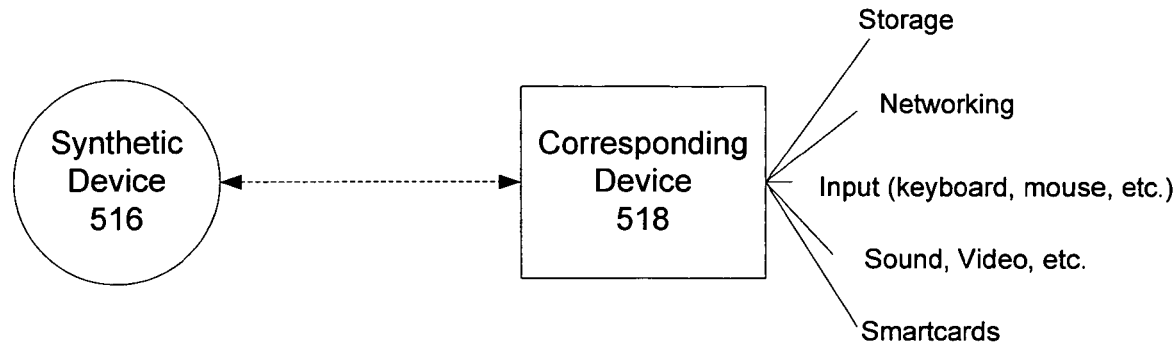
FIG. 5B illustrates the types of synthetic devices that may be used in various aspects of the invention, which includes storage controllers and drag-and-drop devices.
Figure 5B:
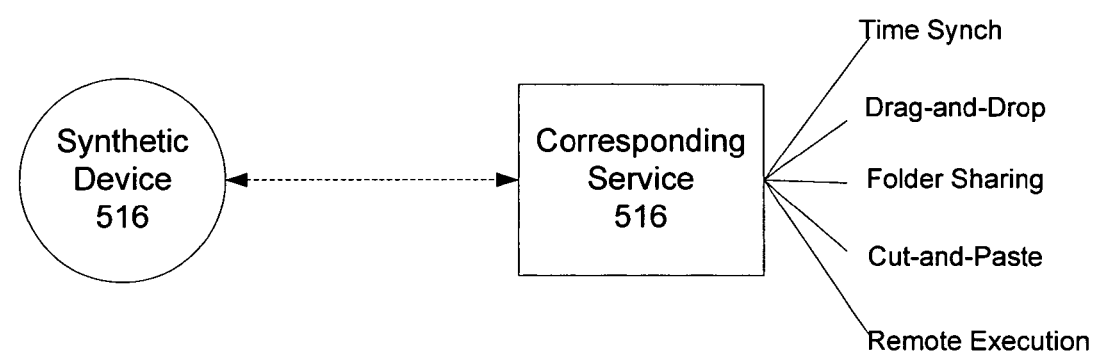

FIG. 5B illustrates the types of devices and services that might correspond to synthetic devices usable on the partition bus. Specifically in reference to FIG. 5B, synthetic device 516 is presented. This synthetic device 516 might correspond to the variety of devices 518: storage, networking, input (keyboard and mouse), sound, video, smartcards, etc. The synthetic device 516 might also correspond to the variety of services 518: time synch, drag-and-drop, folder sharing, cut-and-paste, remote execution, remote application launch, inter-process-communication. There is really no limit on what kinds of devices and services can be modeled by the synthetic device 516.

Partition Bus: Data Transport

Figure 6:
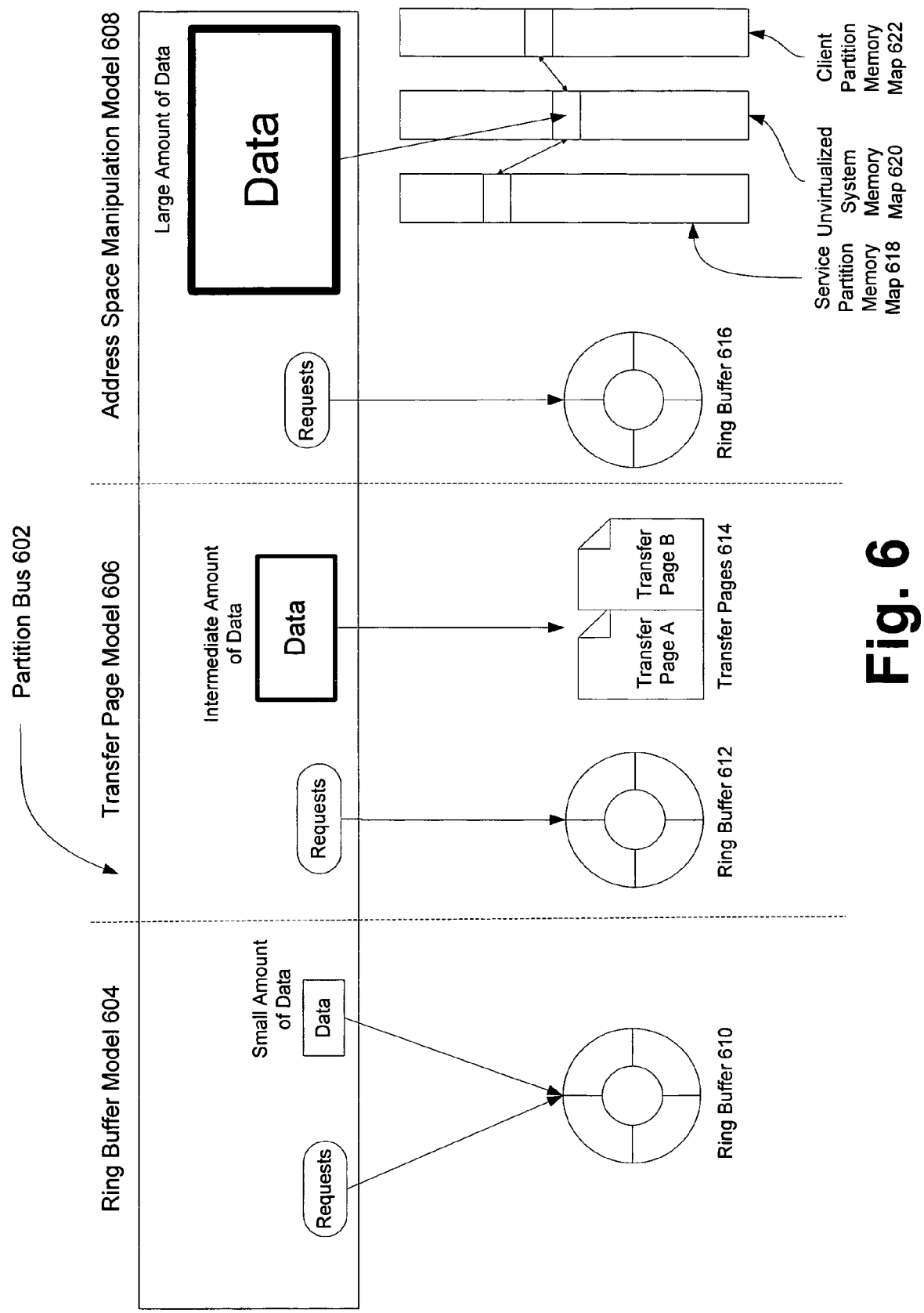
FIG. 6 illustrates the different types of data transfer mechanisms used by the partition bus, which includes a ring buffer model, a transfer page model, and a address space manipulation model.

The partition bus 602 allows for the transferring of requests (or commands) and data in at least three distinct ways, depending upon whether the amount of data that is to be transferred, from one partition to another partition, is small, medium, or large. Thus, in FIG. 6, the three models for sending data are illustrated: the ring buffer model 604; transfer page model 606; and address space manipulation model 608.

Generally, the ring buffer model 604 uses ring buffers 610 to send both requests and data from one partition to another partition. Ring buffers are simply buffers of fixed size, such that when they fill, further information is placed back at the start of the buffer, overwriting the old data, in a "ring." In a typical virtualized system, the ring buffer is made available to two or more OSes simultaneously.

The transfer page model 606 uses ring buffers 612 to send requests and transfer pages 614 to send data (two transfer pages are illustrated: pages A and B). Transfer pages are pages allocated in memory for the transferring of information by copying information from one partition into the allocated page an out of the allocated pages into another partition. The transfer page model differs from the ring buffer in that it has no structure, protocol, or associated ordering. Thus, the transfer page model is more appropriate as a target of DMA operations and to avoid holding locks while manipulating data within the transfer pages.

Finally, the address space manipulation model 608 is illustrated. Like the other two models, a ring buffer 616 is used for storing requests from one partition to be read by another partition. Also, three memory maps a shown: a service partition memory map 618, a client partition memory map 622, and an unvirtualized system memory map 620. A client partition and a service partition can change some of their memory mappings 618 and 622 to correspond to an unvirtualized system memory mapping 620 so that data does not have to be copied (unlike in the transfer page model scenario) but instead can be accessed by both partitions and read. This means that the client partition and the service partition change their memory maps so that they share some physical memory pages in common. The trade-off is that the memory maps 618 and 622 of the client and service partitions, respectively, have to be changed initially to correspond to some unvirtualized system memory map 620, and then changed back to their original mappings once any given transaction is complete. Thus, in contrast to the transfer page model which uses copying to transfer data between partitions, the space manipulation model uses address map changes.

It is worth noting that the notions of small, medium, or large amounts of data are relative concepts and are to some extent defined by computer system resources. Depending on the availability of system resources, the appropriate transfer model can be employed. Hence, based on experience, the ring buffer model is most effective when small amounts of data are to be transferred; the transfer page model is most effective when intermediate amounts of data are to be transferred; and, the address space manipulation model is most effective when large amounts of data are to be transferred.

Thus, in one aspect of the invention the ring buffer model uses regions of memory set aside for passing both requests and data (in combination or alone herein referred to as "information") between two partitions. In this model, packets of information inserted into the ring buffer are ordered in the sense that one packet follows another packet. Also, insertion of a packet into a ring buffer is typically a relatively quick operation since successive packets can't be inserted until previous packets have been inserted. Thus, ring buffers are best suited for data that arrives quickly so there is no significant wait time for successive packets to be inserted.

Figure 7:
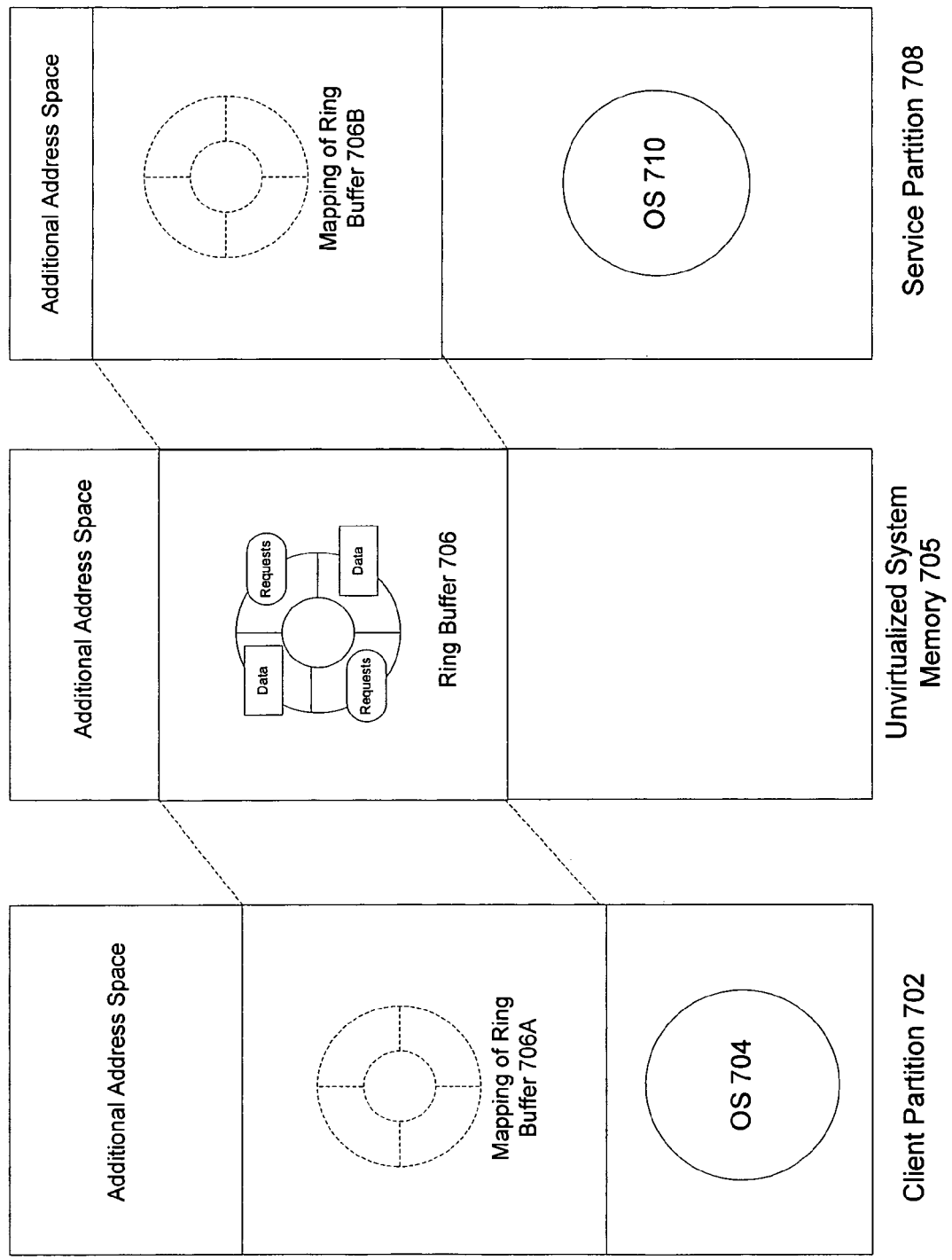
FIG. 7 illustrates the ring buffer model that may be used for sending small amounts of data between partitions.

FIG. 7 illustrates the ring buffer model. A hypervisor (not illustrated) maintains two partitions, a client partition 702 and a service partition 708. The service partition 708 may be running some service OS 710, which sends information in the form of data to the client partition 702 and it's OS 704. The data is successively ordered and placed into a ring buffer 706. Likewise, information in form of requests can be sent from the client partition 702 via the ring buffer 706 to the service partition 708 to request the performance of some services. The ring buffer 706 in the unvirtualized system memory 705 is mapped 706A and 706B into both partitions 702 and 708, respectively, to allow this swapping of requests and data between the two partitions 702 and 708. Thus, FIG. 7 illustrates two packets of requests and two packets of data being sent via the ring buffer 706 between the service partition 702 and the client partition 708.

In another aspect of the invention, the transfer page model is employed. In this model, pools of pages are managed by a transport library. Interestingly, either the service partition or the client partition can allocate a transfer page set at any time and add it to an existing set already in use. The partition that allocates a transfer page set owns management of that set, including allocation and deallocation of pages within that set.

The only cost associated with transfer pages comes at the time when they are allocated and mapped into both the client and the service partitions. The partitions' physical address maps are also changed, but this is a one-time operation which can be amortized across many transfers. Moreover, since the transfer pages are permanently mapped into both partitions, secrets cannot be stored in them, but this also means that they never need to be scrubbed.

Figure 8:
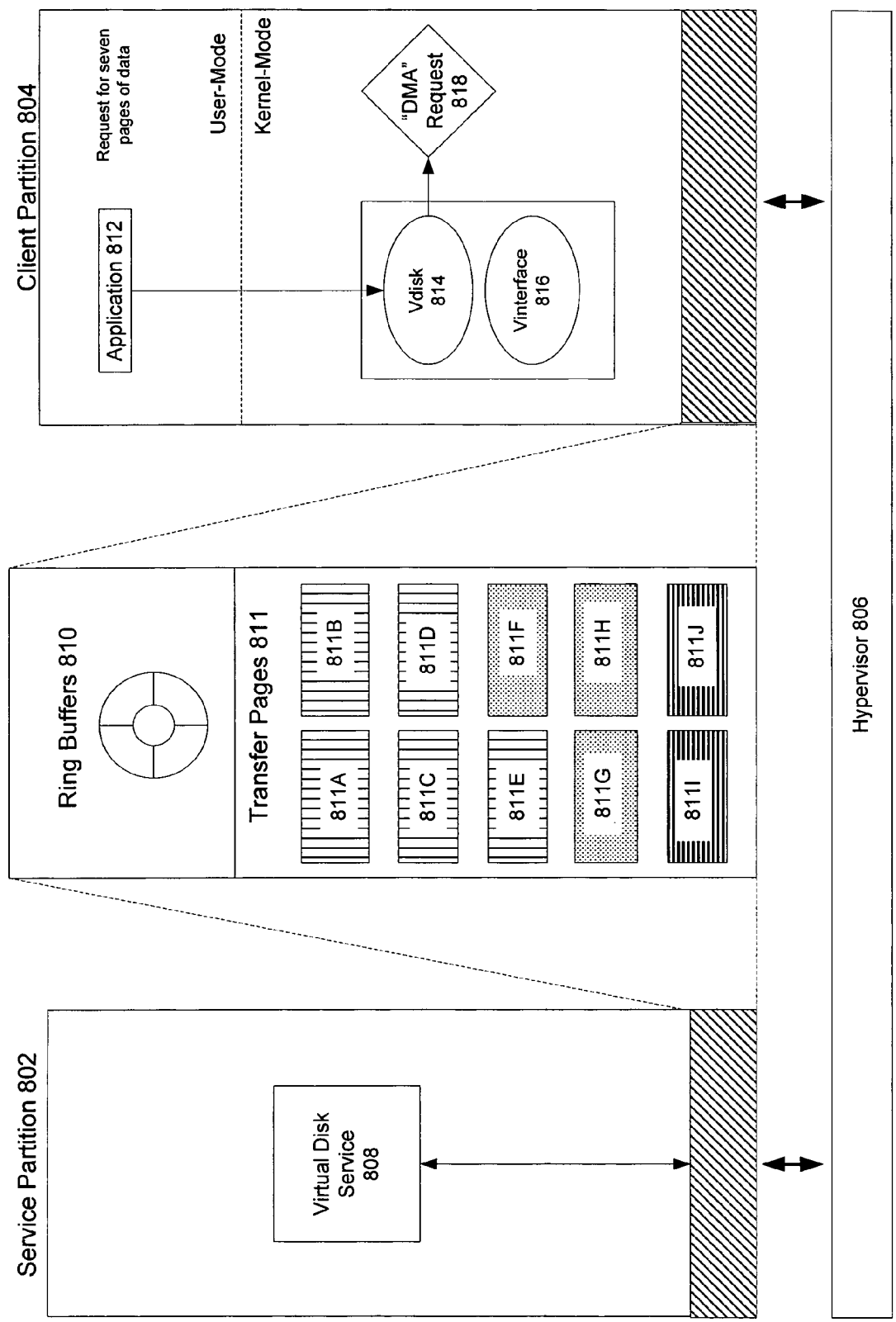
FIG. 8 illustrates the transfer page model that may be used for sending intermediate amounts of data between partitions.

As mentioned above, the transfer page model illustrated in FIG. 8 differs from the ring buffer model illustrated in FIG. 7 in that it the transfer pages don't need structure, protocol, or ordering associated with them, which allows a client more freedom to use transfer pages as the target of DMA operations and to avoid holding locks which manipulating data within them.

FIG. 8 illustrates an exemplary implementation of the transfer page model. A service partition 802 and a client partition 804 are depicted, where these two partitions are maintained by a hypervisor 806. In FIG. 8, a user-mode process in the client partition 804 requests data from a file which is being handled by a virtual disk service 808 in the service partition 802. The request to get data from the service partition 802 is modeled as a hardware direct memory access (DMA) transaction.

By way of example, an application 812 first creates a request for seven pages of data, which is more than happens to be available in the transfer pages 811. Thus, the request has to be broken up into two sub-requests. The first request is passed down to a virtual disk driver 814. In some instances, this may be a filter, in others, it may be a fully-enlightened disk driver (i.e., a disk driver that only communicates with synthetic devices and has no vestiges of virtualization functionality left in it; in a broad sense, the term "enlightened" refers to an OS environment that is aware that it is running within a virtualized environment).

The virtual disk driver 814 creates a standard DMA request 818 using functions it got from its physical device object (PDO). The virtual disk driver interface instance 816 then allocates all of the currently available pages from a pool of transfer pages. In this example, this amounts to five pages 811A-811E, which are shown in the transfer pages 811 using vertical lines.

Next, a request is sent to a server in the service partition 802 to get these pages from the virtual disk service 808. When the server has filled in the requested pages, i.e., copied the requested data into the pages 811A-811E, it sends a message back to the client partition 804. The data is then copied from the transfer pages into buffers maintained by the application 812. When the copy operation is finished, the transfer pages 811A-811E are freed.

For the second request, two more pages, 811I and 810J, are allocated from the pool (the other depicted pages, 810F-810H are pages reserved by other requests, which are not shown). Thus, a new request is sent to the service partition 802 for two pages of data. As before, the service partition 802 server fills in the data to the transfer pages 811I-811J and sends a message regarding its operation back to the client 804. Data is then copied into the application 812 buffers again, and the request, which was originally broken up into two phases is thus completed.

The transfer pages 811 are used to transfer data. Requests is transferred using ring buffers 810. The sequential and packet nature of requests transfer in this aspect of the invention is similar to that discussed in FIG. 7, where requests and data are transferred using only ring buffers.

Figure 9:
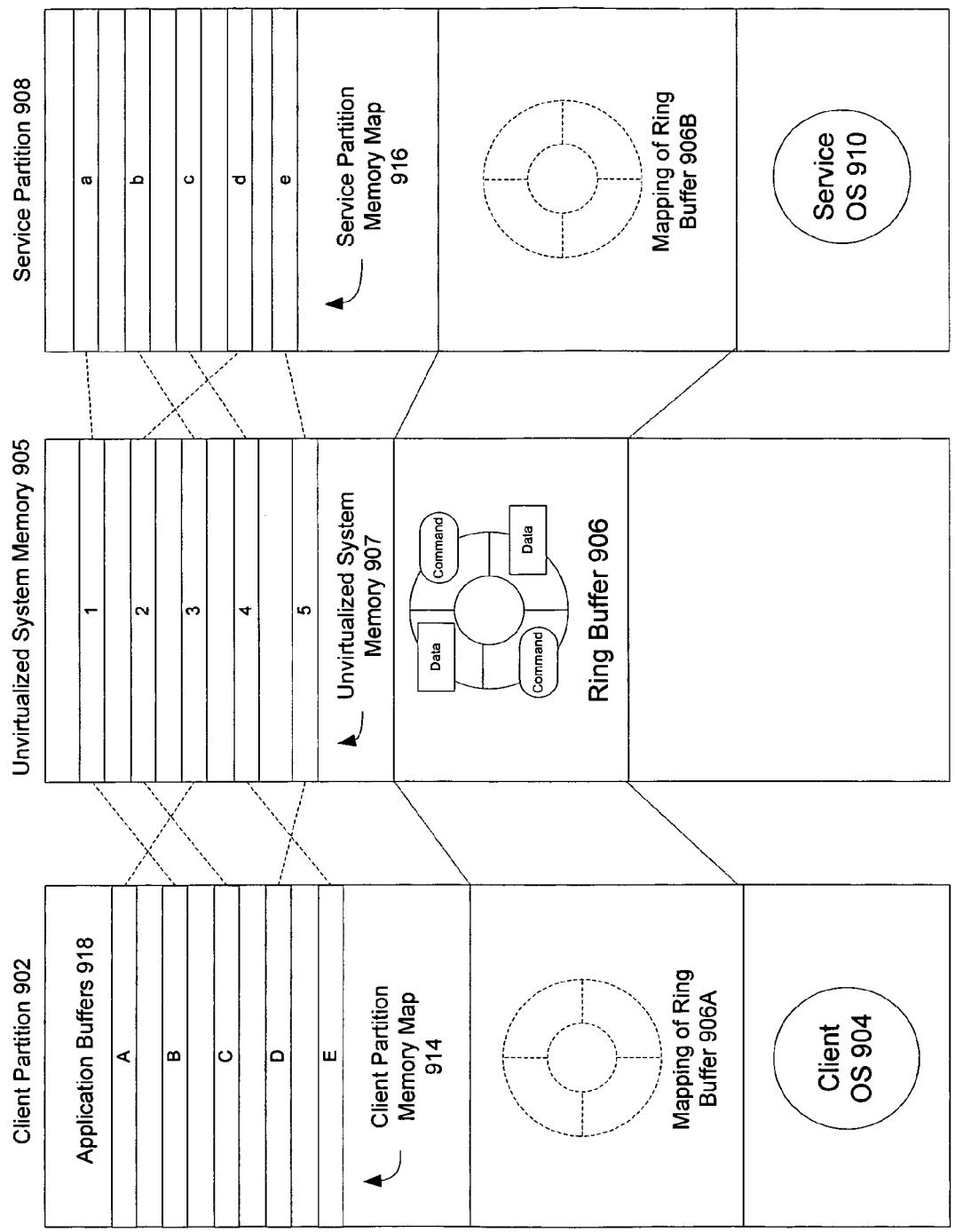
FIG. 9 illustrates the address space manipulation model that may be used for sending large amounts of data between partitions.

In other aspects of the invention, address space manipulation is used to avoid the high cost of memory copying that is performed under both the ring buffer and transfer page models discussed above in FIGS. 7 and 8, respectively. Some transactions involve buffers which are arbitrarily placed in a client's physical address space and very large amounts of data need to be transferred. In this situation, transfer pages are not used because they would force the copying of data from the transfer pages, which are in fixed locations, into the buffers that are arbitrarily placed. To ensure that data can be placed directly into the memory that it ultimately needs to be in, the physical address map of a service partition must be changed, so that it, at least temporarily, contains the pages from a client partition. Then, the data can be written directly into or read directly from those pages, either by software or hardware. After the transaction is complete, the address map is changed back, deleting the client's pages from the server's physical address map. Since this set of operations is comparatively expensive, it is not used for transferring small amounts of data—where copying the data into and out of transfer buffers is more efficient than changing address maps In FIG. 9, a client partition 902 and a service partition 908 are illustrated, where both partitions are maintained by a hypervisor (not shown). Each partition 902 and 908 has its own OS, 904 and 910, respectively. These OSes maintain memory address maps 914 and 916, respectively, that map virtual addresses to partition physical addresses. If large amounts of information (mainly data) is to be transferred between these partitions, the most efficient mechanism involves changing relevant client partition memory mappings 914 and associating them with some unvirtualized system memory mappings 907. For example, in FIG. 9, the "A" mapping in the client partition 902 is associated with the "3" mapping in the unvirtualized system memory 905. Likewise, the service memory mappings 916 are associated with the unvirtualized system memory mappings 907, so that both the client partition 902 and the service partition 908 can access the unvirtualized system memory 905 without having the need to copy data from one place in memory to another place. Thus, the "b" mapping in the service partition 908 is associated with the "3" mapping in the unvirtualized system memory 905. The trade-off for not copying is that the memory mappings have to be changed at the beginning of a transaction and back again once a transaction is complete. This trade-off works well when large amounts of data have to be transferred.

Figure 10:
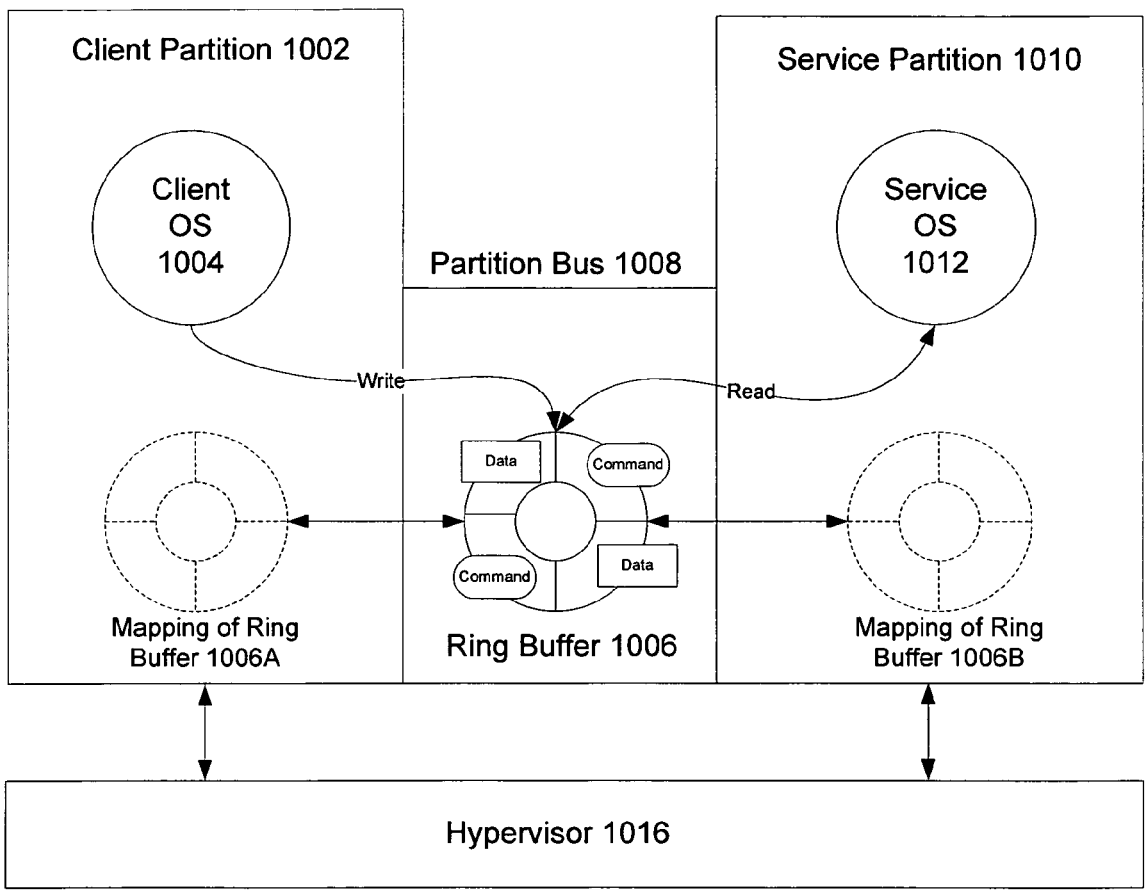
FIG. 10 illustrates a mechanism for sending data between partitions without incurring the cost associated with a context switch.

In another aspect of the invention, FIG. 10 illustrates a mechanism for sending information between partitions without incurring the cost associated with a context switch. With OSes running in their respective partitions, the CPU switches between these partitions, providing each with a time-slice. In such a time sharing system, upon a context switch, there is a cost associated with switching from one task (or partition) to another task (or partition).

Moreover, sending interrupts between partitions also involves reasonably expensive context switching. For example, such an interrupts might have to be sent if a client partition wants to "wake-up" a service partition so that it can obtain services from the service partition. Likewise, the service partition may want to let the client partition know, via an interrupt, that it has completed the task specified by the client partition.

In order to avoid such expensive context switching, in FIG. 10, in this aspect of the invention, ring buffers are used as command queues for one partition to put its commands in the ring buffer of another partition, thus avoiding the sending of interrupts except under rate conditions (discussed below).

Thus, a client partition 1002 and a service partition 1010 are illustrated. Each partition is running some operating system, whether Windows 98 or Windows XP, and these partitions are maintained by some hypervisor 1016. When the client partition 1002 wants a service from the service partition 1010, say, for example, a disk controller service—which is may be owned by the service partition 1010, and which may correspond to some synthetic device on the service partition 1010—one way to obtain this service is for the client partition 1002 to write information (typically commands/requests) into the ring buffer 1006. The service partition 1010 can then read these commands and comply with any requests. The fact that the ring buffer 1006 is mapped (1006A and 1006B) into both partitions 1002 and 1010 allows these partitions to communicate without incurring context switching costs.

The service partition 1010 can also write information (typically responses to requests and/or data) into the ring buffer 1006 to let the client partition 1002 know that its requests have been completed. In this scenario, the ring buffer 1006 is used to represent the partition bus 1008, but other models discussed above could apply.

A partition employing this ring buffer implementation does not need to get an interrupt in order to read the command from the ring buffer, so the cost of sending the interrupt (and all the associated context switching) can be avoided. However, when, for example, a service partition is not running the commands sent to it from a client partition, then an interrupt is the appropriate way to cause those commands to start running.

In short, the ring buffer model in this case avoids context switching costs, but may use interrupts under two conditions: (1) when an outgoing ring buffer has been empty and is later non-empty, or (2) when an incoming ring buffer has been full and is later not full, interrupts may have to be sent from one partition to the other (from the client partition's 1002 point of view, ring buffer 1014 is the outgoing ring buffer and ring buffer 1006 is the incoming ring buffer—the reverse is true from the service partition's 1010 point of view).

For example, in the first case, when ring buffer 1014 has been empty and is later non-empty, the client partition 1002 may have to let the service partition 1010 know that it's ring buffer 1014 has been filled with information (probably command/requests). In the second case, when ring buffer 1006 has been full and is later not full, the client partition 1002 may let the service partition 1010 know, via an interrupt, that it's ring buffer 1006 is no longer filled up.

This aspect of the invention works particularly well in a machine with more than one processor. It is possible to get both the client partition 1002 and the service partition 1010 running simultaneously, with each sending information to the other without incurring a context switch.

A variant on this aspect of the invention will introduce a delay before sending the interrupt in the case that the partition that would have received the interrupt will happen to run again in a very short time, thus making the interrupt unnecessary. The delay will increase latency, of course, but the cost of the latency may be less than the cost of the interrupt.

Figure 11:
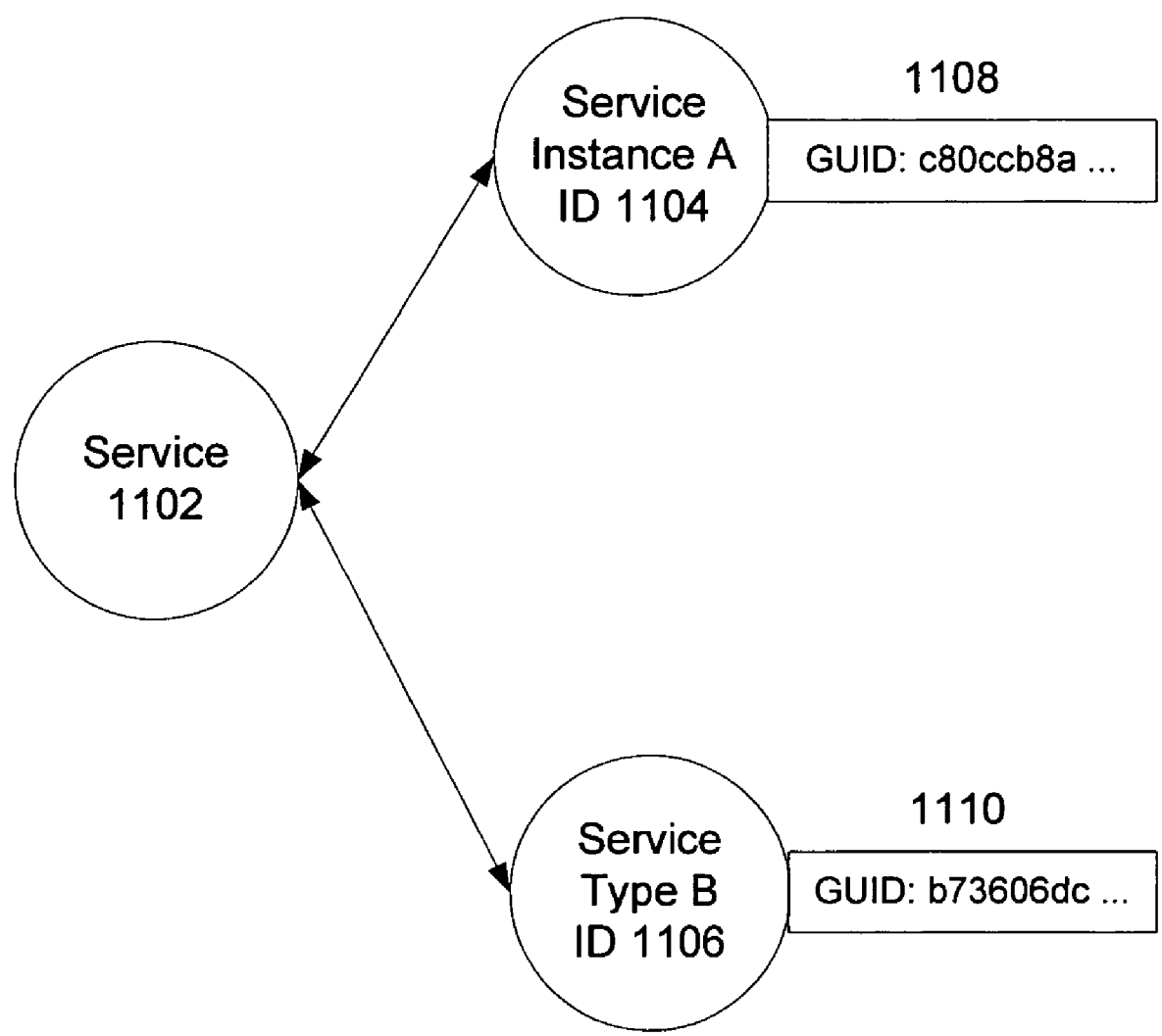
FIG. 11 illustrates a partition bus versioning mechanism for interfaces and protocols.

In another aspect of the invention, the partition bus allows for different versions and instances of a service to exist side-by-side. In FIG. 11, a service 1102 is provided. Each service's ID is made up of two 128 bit Globally Unique IDs (GUIDs). The first of these IDs uniquely identifies a service instance. For example, service instance A 1104 can be a virtual disk, where this virtual disk gets a unique ID 1108 assigned to it (e.g. c80ccb8a . . . ) and any other instances of a virtual disk (not pictured) will receive different unique IDs.

Along with a service instance ID, there is also a service version ID, also represented by a GUID. This GUID identifies the protocol that is implemented by a server. (The protocol can be the sum total of all the commands and operations managed by the server). Thus, in FIG. 11, the service version ID 1106 for the service 1102 is: b73606dc . . . . These two GUIDs are used to create the bus-level Plug-and-Play IDs of synthetic devices on the partition bus. An instance of an OS running in a client partition can decide based on these Plug-and-Play IDs which driver to load, allowing that OS to maintain drivers for multiple versions of a service, possibly even in separate driver files. Moreover, different device versions—just like services—can be provided with GUIDs to ascertain the device instance and device version.

Furthermore, it is entirely possible for a server partition to simultaneously create multiple instances of services for a single resource, such as a disk, each service implementing different protocol versions. A client partition might be offered two instances of the same virtual disk, choosing to load only the driver associated with the protocol version that it supports.

In certain aspects of the invention, the ability to make policy decisions based on the identity and trustworthiness of partitions is presented. Partition bus channels may not be welcome in some partitions. Specifically, it may not be appropriate to allow a channel offer to reach a particular secure partition. There are various reasons for this policy: (1) not wanting to allow a partition to masquerade as the boot disk server for a secure partition; (2) not wanting to allow 1/O paths that aren't trusted, or; (3) not wanting to allow a partition to use any resources at all in another partition, which might happen when an channel offer is made.

Figure 12:
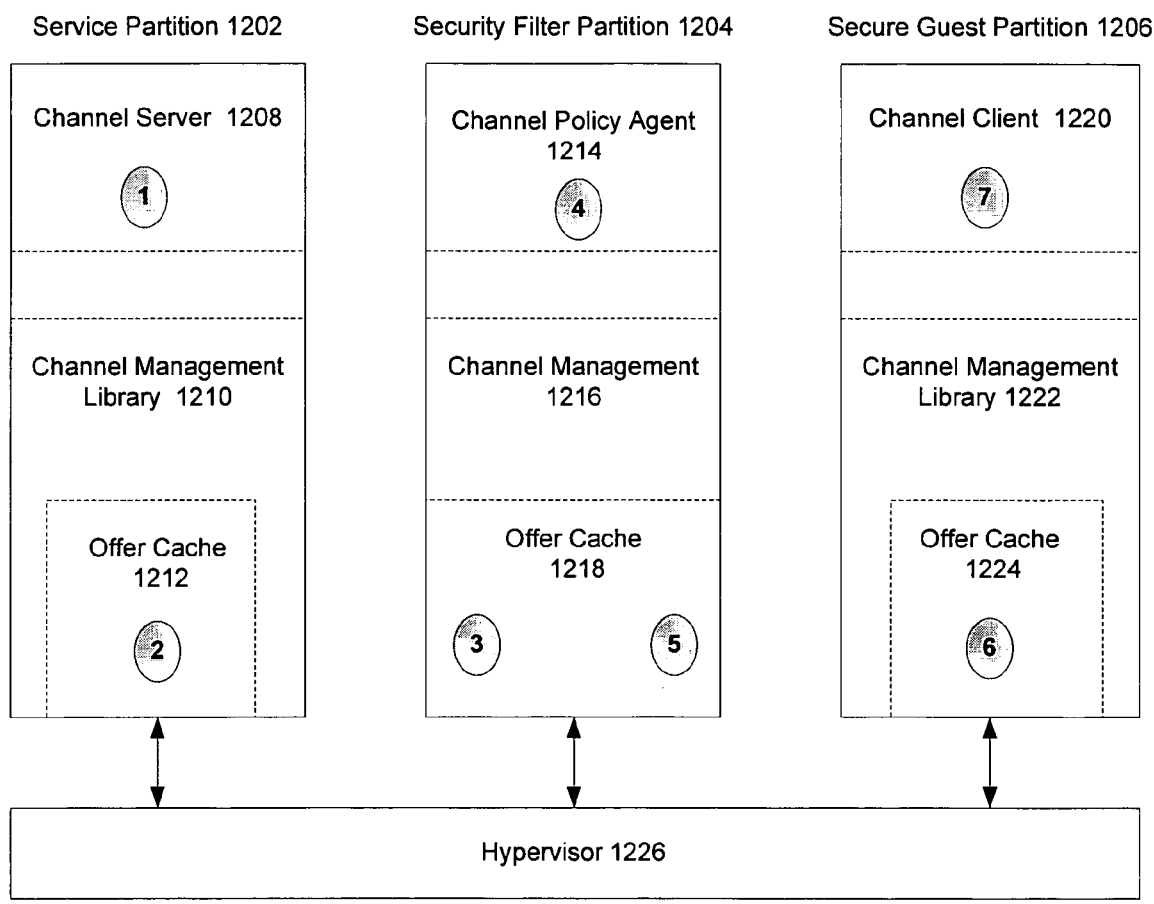
FIG. 12 illustrates policy decision that are made by one partition based identity and trustworthiness of another partition.

To support such policy decisions, the present aspect of the invention teaches a partition bus channel policy agent. The channel policy agent arbitrates channel offers. FIG. 12 illustrates a channel policy agent implemented in an instance of a partition running a version of Windows. Presumably, such an agent would have to access things like a partition manifest, which would stipulate that some specific I/O channels should be allowed for this partition but not others.

A state diagram of this aspect of the invention is illustrated in FIG. 12. In FIG. 12, three partitions maintained by a hypervisor 926 are illustrated: (1) a service partition 1202, (2) a security filter partition 1204, and (3) a secure guest partition 1206. In the service partition 1202, first, a channel server 1208 sends a request to the channel management library 1210 with a channel offer. Second, that offer is stored in an offer cache 1212. The offer cache 1212, in turn, forwards the offer to the offer cache 1218 of the security filter partition 1204 (or wherever the policy agent happens to be residing for a secure partition).

Third, the channel management library 1216 in the security filter partition 1204, sends the offer up to the channel policy agent 1214 to be vetted. Fourth, the channel policy agent 1214 sends a response to the channel management library 1216, telling the library 1216 either to terminate the offer or to forward it. Fifth, if the offer is to be forwarded, it is sent to the offer cache 1224 in the trusted guest partition 1206.

Sixth, when the offer arrives at the offer cache 1224, it triggers an enumeration channel, and software in the trusted guest partition 1206 decides to open the channel. Seventh, the channel client 1220 then sends a message directly back to the channel server 1208, opening the channel. Thus, in this way, channel offers can be arbitrated by policy agents located in a security filter partition.

Partition Bus: Additional Aspects

In another aspect of the invention, emulated device modules (EDMs) operate concurrently and in concert with enlightened (virtual-machine-aware) data transfer mechanisms like the partition bus. An EDM is written to respond to I/O requests in the same manner as a physical hardware device. If a given guest operating system was written to support the physical hardware device in question (i.e. it contains the corresponding driver), that operating system will operate correctly without modifications, assuming the EDM is written correctly. EDMs therefore provide excellent compatibility with legacy operating systems, but they typically introduce a high virtualization overhead. Virtualization Service Providers (VSPs), by contrast, provide much better performance, but they require new drivers (and potentially other modifications) to be written for the client OS.

In one instance of a virtual machine system, both VSPs and the EDMs are implemented, at least some of the time, in the same service partition, where the VSPs are the services that sit on top of the partition bus, providing the back-end support for synthetic devices in a client partition, in contrast to emulated or virtual devices which are available within the client partition. VSPs are what synthetic devices communicate with.

Figure 13:
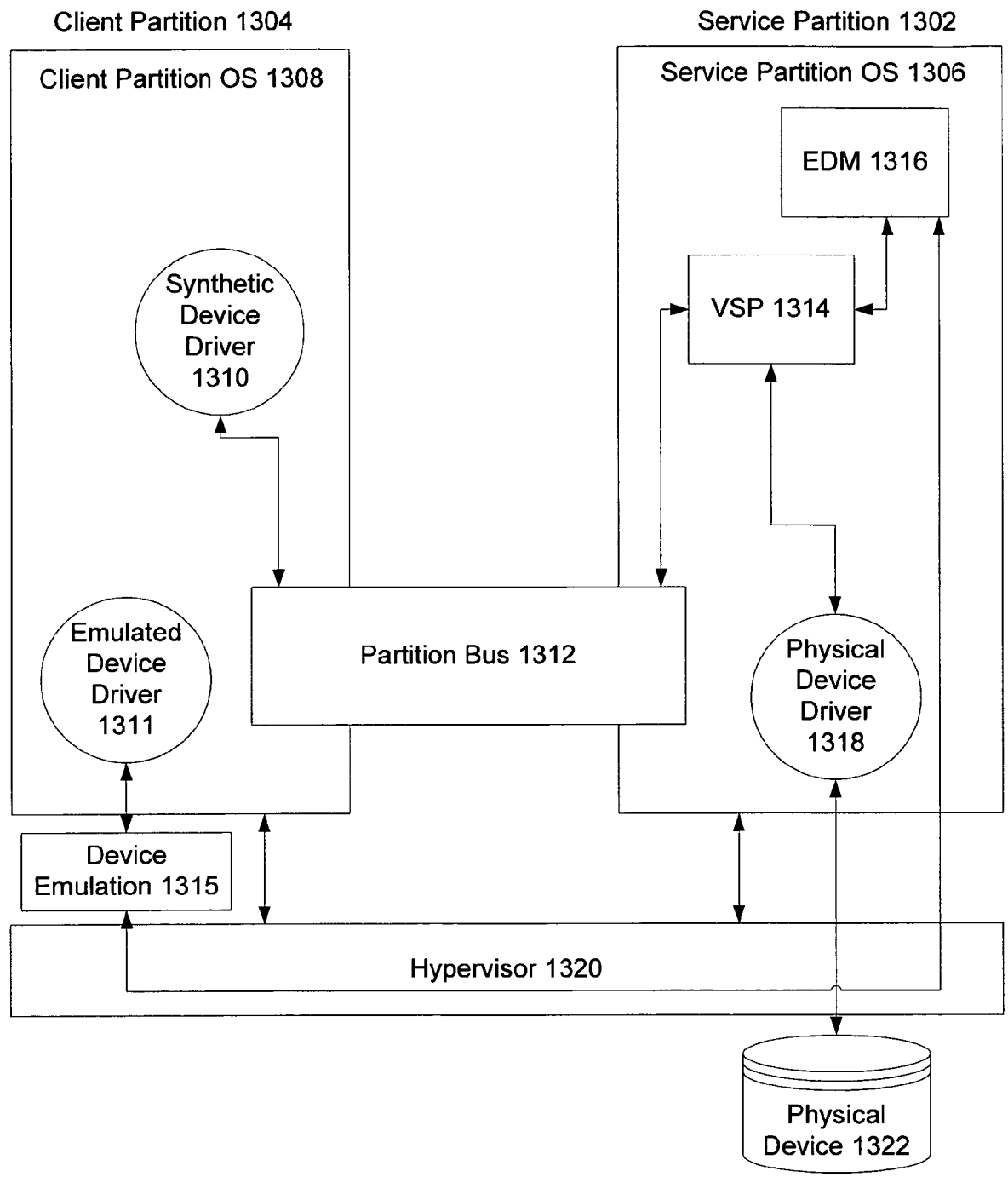
FIG. 13 shows the simultaneous operation of emulated device modules and virtualization service providers.

Specifically, FIG. 13 depicts a client partition 1304 and a service partition 1302, containing their respective OSes, 1006 and 1308, running in the partitions. The partition bus 1312 provides a communication means between the two partitions 1302 and 1304. Also, both of these partitions 1302 and 1304 are maintained by a hypervisor 1320. The EDM 1316 communicates with the hypervisor 1320 to cause a device emulation 1315 to appear as a real device to the client partition 1302. The EDM 1316 also depends on the VSP 1314 to communicate with the actual physical device 1322 (via the device driver 1318) which is being shared with the client partition 1302. The VSP 1314 also exposes this device 1322 to the client partition 1302 through a synthetic device.

Figure 14A:
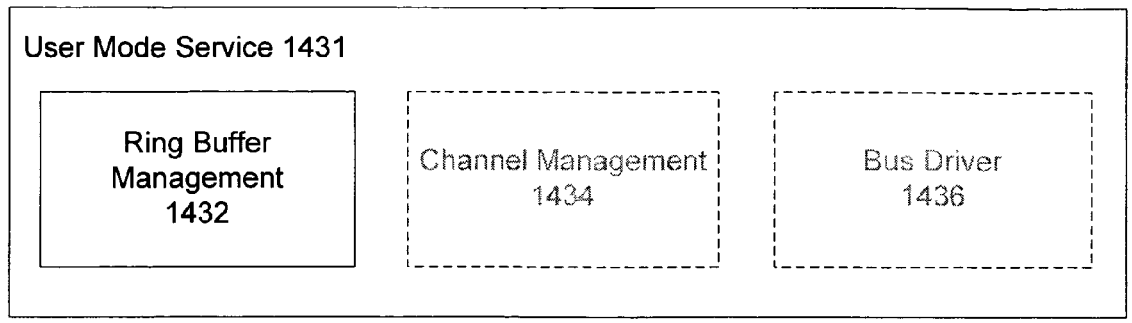
FIG. 14A illustrates the user-mode aspect of a particular implementation of the partition bus.

In yet another aspect of the invention, the partition bus built from three libraries, or more generally, from three components. Thus, in FIGS. 14A-14C, the components of the partition bus are illustrated as they are used in different modes. The three components are:

Ring buffer management
    Channel management, and
    Bus Driver

Different environments utilize different components of the partition bus. For example, in FIG. 14A, a user mode service 1431 only gets the ring buffer management 1432 component, since it relies on code in kernel mode to do channel management. This is emphasized in FIG. 14A with the ring buffer management 1432 component in a solid box and the other two components, namely, the channel management 1434 and the bus driver 1436 in dashed boxes, with gray fonts to indicate the absence of these two components in the user mode 1431.

Figure 14B:
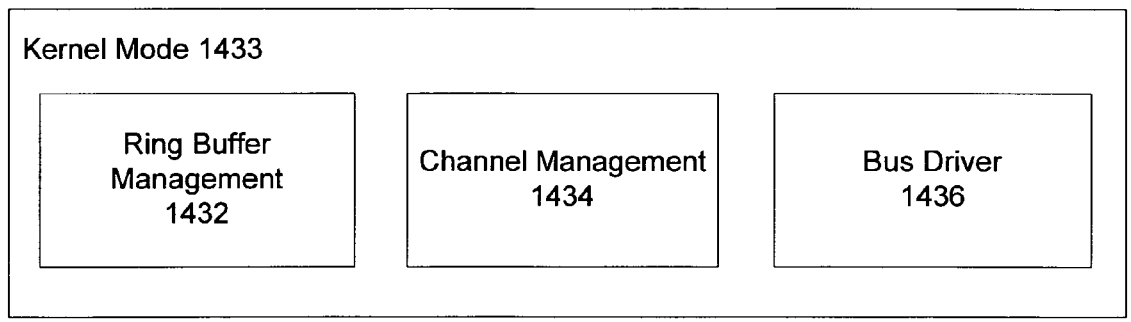
FIG. 14B illustrates the kernel-mode aspect of a particular implementation of the partition bus.

In FIG. 14B, the kernel mode 1433 services receive all three components, i.e., the ring buffer management 1432, the channel management 1434, and the bus driver 1436.

Figure 14C:
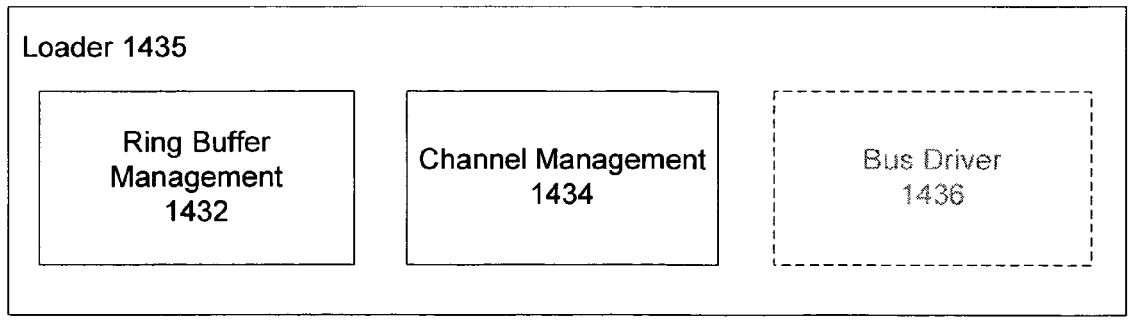
FIG. 14C illustrates the loader aspect of a particular implementation of the partition bus.

And finally, in FIG. 14C, the loader 1435 environments receive the ring buffer management 1432 and the channel management 1434 but not the bus driver 1436 (depicted in a dashed box). In short, the partition bus is put together from these three components—and various other minor components—and these components appear in various combinations depending on the environment in which partition bus is used.

The partition bus uses the ring buffer management 1432 in order to use ring buffers to transfer data between partitions. Channel management 1434 is used to establish channel communications between partitions. Finally, the bus driver 1436 controls the input and output operations between partitions once channels of communication are established. Thus, synthetic devices in some partitions can own real devices in other partitions—at the hardware level—and such real devices can be used by other synthetic devices in other partitions since input and output operations are managed by the bus driver 1436.

It has been noted above that not all uses for the partition bus are directly related to physical devices. Thus, in yet other aspects of the invention, many of the uses which don't correspond to physical devices are conveniently implemented in user-mode components (e.g. DLLs) instead of as kernel-mode drivers. The partition bus provides enough infrastructure to create these components entirely in user-mode, allowing it to perform address space management, interrupt delivery, and other services which are generally only accessible from kernel mode.

While the present invention has been described in connection with the preferred aspects as illustrated in the various figures, it is understood that other similar aspects may be used or modifications and additions may be made to the described aspects for performing the same function of the present invention without deviating therefrom. For example, in certain aspects of the invention, a partition bus was described, where the partition bus provides mechanisms for transferring data between partitions and for assigning ownership of devices to selected partitions while sharing that devices' services with other partitions. However, other equivalent devices to this aspect of the invention are also contemplated by the teachings herein. Therefore, the present invention should not be limited to any single aspect, but rather construed in breadth and scope in accordance with the appended claims.

What is claimed:

1. A method for transferring data between partitions in a virtual machine environment, comprising:
    managing, by a virtualizing program, a first partition and a second partition, the first partition including a first operating system and a virtualized input/output device and the second partition including an input/output device;
    configuring a partition bus to transfer information between the virtualized input/output device and the input/output device, the partition bus including an overwriting buffer that operates within memory addresses of the first and second partitions;
    receiving, by the virtualized input/output device, a request to send information to the input/output device; and
    sending, via the overwriting buffer, the information to the input/output device.

2. The method according to claim 1, further comprising:
    determining that the overwriting buffer is empty; and
    sending an interrupt to the second partition directing the second partition to access the overwriting buffer.

3. The method according to claim 1, further comprising:
    writing, by the second partition, information associated with the first partition to the overwriting buffer;
    determining, by the second partition, that the first partition wrote the information to the overwriting buffer; and
    reading, by the second partition, the information.

4. The method according to claim 1, wherein the second partition includes a second operating system.

5. The method according to claim 4, wherein the second operating system includes one or more device drivers for one or more hardware devices.

6. The method according to claim 5, wherein the request is to access the one or more hardware devices via the one or more device drivers.

7. The method according to claim 1, further comprising:
    initializing, by the virtualizing program, the partition bus.

8. The method according to claim 1, wherein the information includes a request to send data to the second partition.

9. The method according to claim 8, further comprising:
    determining that the size of the data is greater than a first predetermined size and less than a second predetermined size, the data stored in one or more pages of memory allocated to the first partition;
    copying the one or more pages of memory allocated to the first partition that store the data; and
    storing the copied data in one or more pages of memory allocated to the second partition.

10. The method according to claim 8, further comprising:
    determining that the size of the data is greater than a second predetermined size, the data stored in one or more pages of memory allocated to the first partition, the one or more pages of memory allocated to the first partition corresponding to one or more pages of system memory; and
    remapping the one or more pages of system memory to pages of memory allocated to the second partition.

11. A computer system, comprising:
    a processor coupled to an I/O device and a computer readable storage medium, the computer readable storage medium including:
    instructions for virtualizing the processor, system memory, and the I/O device;
    instructions for managing a first and second partition, the first partition configured to interface with the virtualized processor, system memory, and the I/O device;
    instructions for effectuating a partition bus between the first and second partition, the partition bus including an overwriting buffer that operates within the first and second partitions;
    instructions for transferring information, via the overwriting buffer, between the first and second partitions;

instructions for transferring, via instructions for effectuating a transfer page mechanism, data greater than a first size between the first and second partitions; and instructions for transferring, via instructions for effectuating an address space manipulation mechanism, data greater than a second size between the first and second partition; and instructions for determining which transfer mechanism to use to service a request based on a size of the request, the transfer mechanism selected from a group of transfer mechanisms comprising the partition bus, the instructions for effectuating a transfer page mechanism, and the instructions for effectuating an address space manipulation mechanism.

12. The system according to claim 11, wherein the instructions for effectuating the transfer page mechanism further comprise:

instructions for copying data stored in one or more pages of memory allocated to the first partition; and instructions for storing the copied data in one or more pages of memory allocated to the second partition.

13. The system according to claim 11, wherein the instructions for effectuating the address space manipulation mechanism further comprise:

instructions for identifying one or more pages of memory allocated to the first partition, the identified one or more pages corresponding to one or more pages of system memory, the one or more pages of system memory storing data; and instructions for remapping the one or more pages of system memory to pages of memory allocated to the second partition.

14. The system according to claim 11, further comprising:

instructions for managing, by the second partition, a specific I/O device;

instructions for receiving, by the second partition via the specific I/O device, information associated with the first partition; and instructions for sending, via the overwriting buffer, the information associated with the first partition to the first partition.

15. The system according to claim 11, further comprising:

instructions for determining that the overwriting buffer is empty; and instructions for sending an interrupt to the second partition directing the second partition to access the overwriting buffer.

16. The system according to claim 11, further comprising:

instructions for writing, by the second partition, information associated with the first partition to the overwriting buffer;

instructions for determining, by the second partition, that the first partition wrote the information to the overwriting buffer; and instructions for reading, by the second partition, the information.

17. The system according to claim 11, wherein the second partition includes a second operating system configured to interface with the virtualized processor, system memory, and the I/O device.

18. The system according to claim 11, wherein the first partition includes a first operating system configured to interface with the virtualized processor, system memory, and the I/O device.

19. A computer readable storage medium storing thereon computer executable instructions for providing integration between partitions in a virtual machine environment, comprising:

instructions for effectuating a hypervisor, the instructions for the hypervisor configured to manage, a first partition and a second partition, the first partition including an operating system;

instructions for initializing a partition bus, the partition bus configured to transfer information between the first partition and the second partition, the partition bus including a shared buffer that operates within memory addresses of the first and second partitions;

instructions for receiving a request to send information to the second partition; and instructions for sending, via the shared buffer, the information to the second partition;

instructions for transferring, via instructions for effectuating a transfer page mechanism, data associated with the information that is greater than a first size between the first and second partitions; and instructions for transferring, via instructions for effectuating an address space manipulation mechanism, data associated with the information that is greater than a second size between the first and second partition.

* * * * *